Sept. 11, 1923. 1,467,670
L. C. JOSEPHS, JR., ET AL
FURNACE FOR THE HEAT TREATMENT OF METALS
Filed Oct. 9, 1920 3 Sheets-Sheet 1
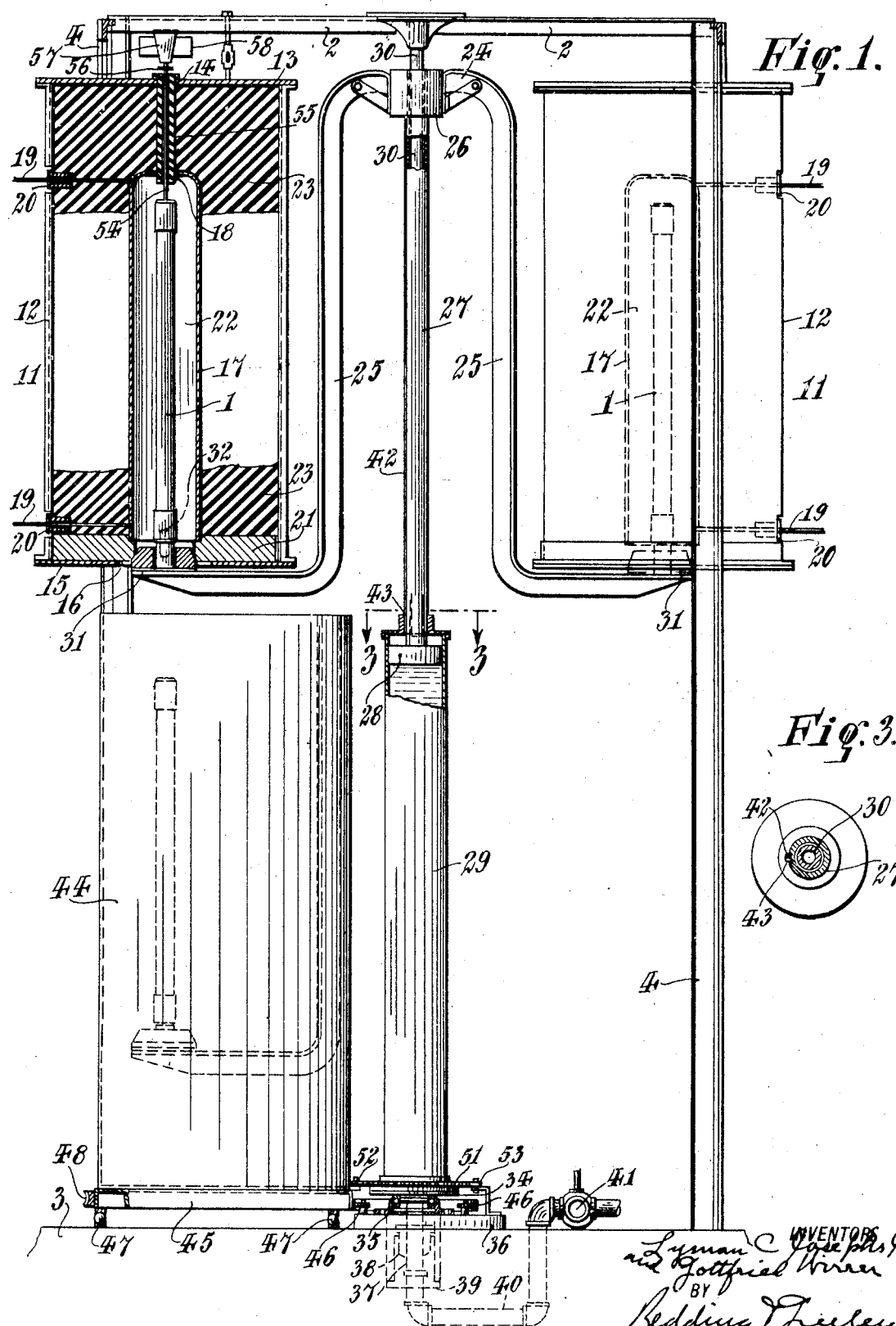

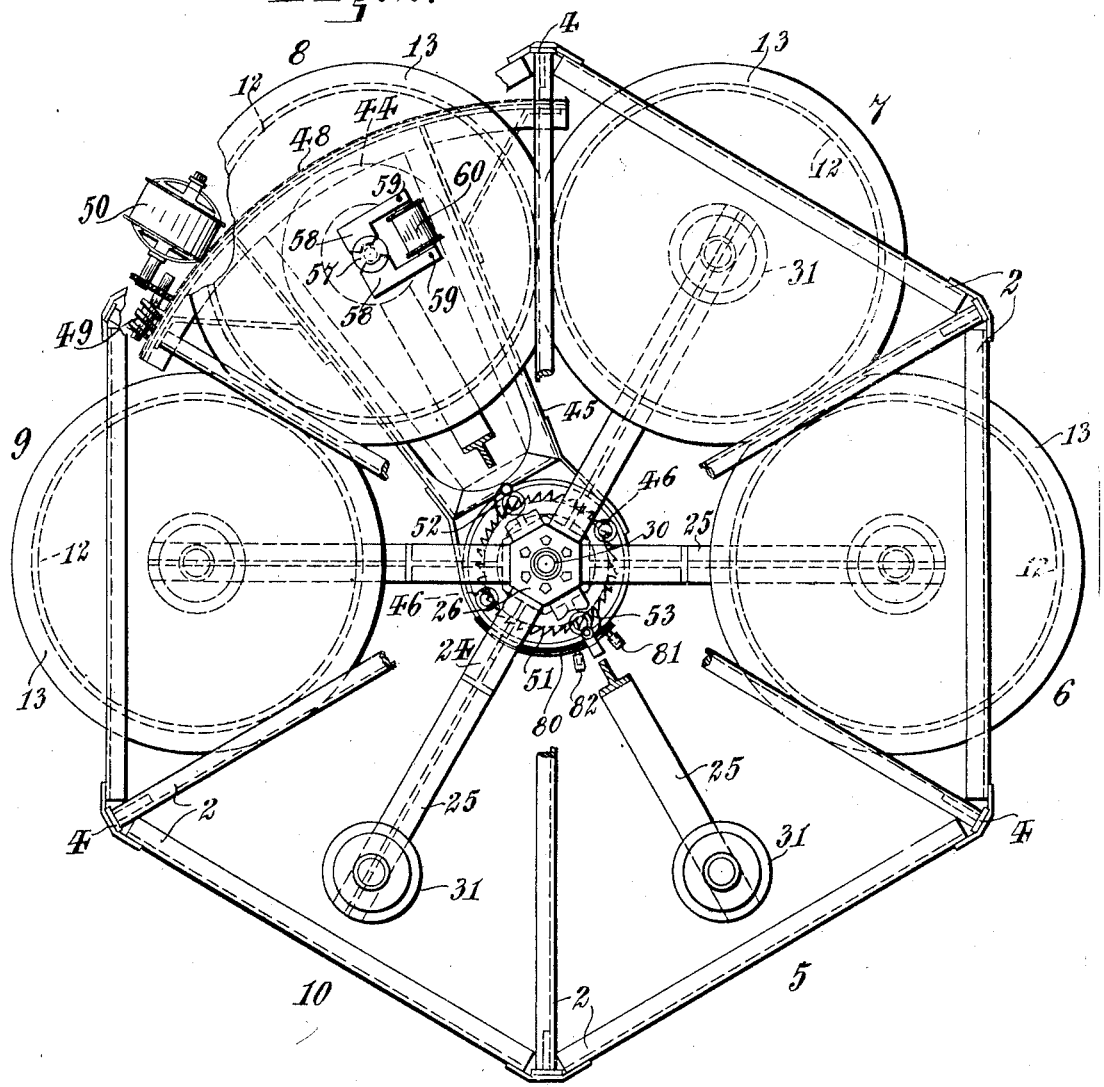

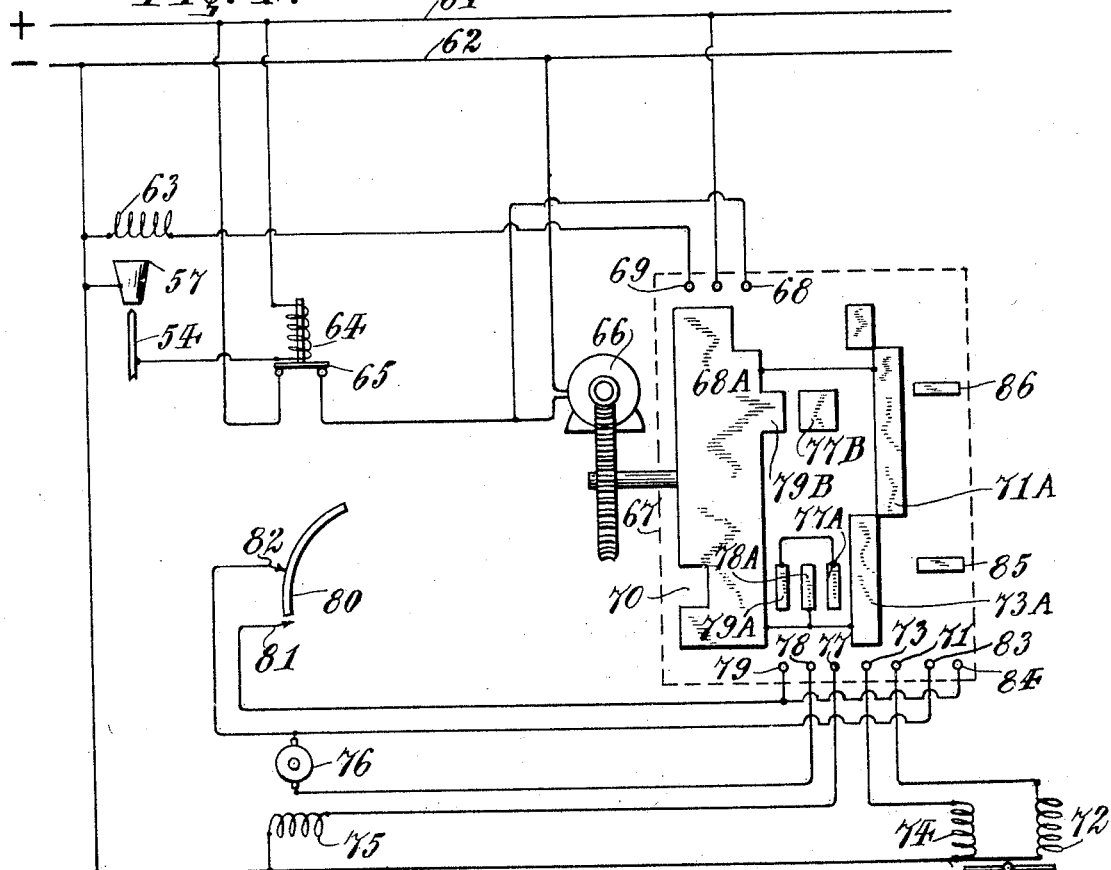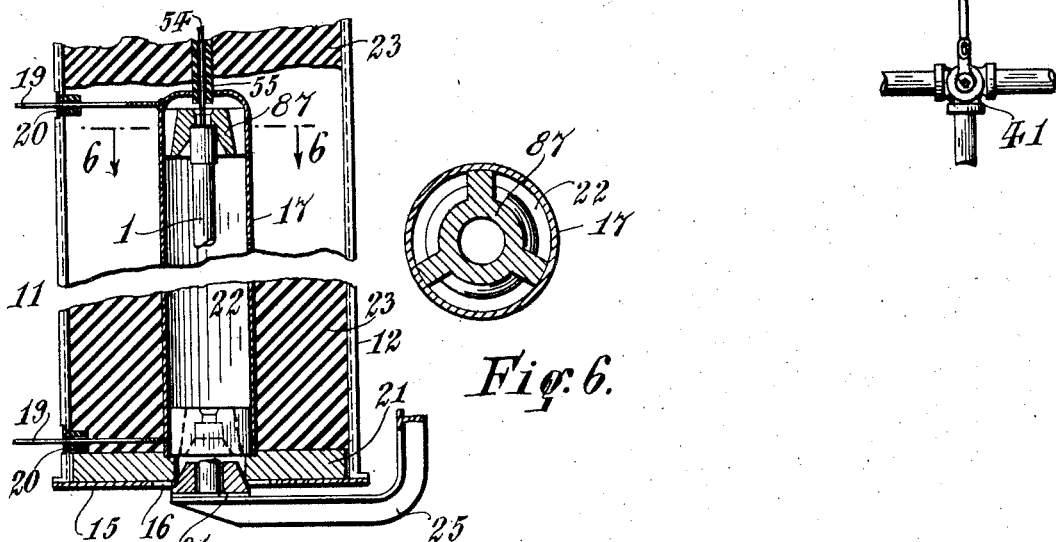

Patented Sept. 11, 1923.

1,467,670

UNITED STATES PATENT OFFICE.

LYMAN C. JOSEPHS, JR., OF ALLENTOWN, PENNSYLVANIA, AND GOTTFRIED WIRRER, OF PLAINFIELD, NEW JERSEY, ASSIGNORS TO INTERNATIONAL MOTOR COMPANY, OF NEW YORK, N. Y., A CORPORATION OF DELAWARE.

FURNACE FOR THE HEAT TREATMENT OF METALS.

Application filed October 9, 1920. Serial No. 415,805.

*To all whom it may concern:*

Be it known that we, LYMAN C. JOSEPHS, Jr., and GOTTFRIED WIRRER, citizens, respectively, of the United States and the Swiss Republic, residing, respectively, in Allentown, Pennsylvania, and Plainfield, New Jersey, have invented certain new and useful Improvements in Furnaces for the Heat Treatment of Metals, of which the following is a specification, reference being had to the accompanying drawings, forming a part hereof.

In other applications for Letters Patent of the United States, made by the present applicants, Ser. Nos. 390,796 and 390,797, filed June 22, 1920, there are described certain improvements in methods of heat treatment of metals, in accordance with which the determination of the critical point in the treatment of the metal is dependent upon the rate of change of dimension of the metal under treatment and the change in heat treatment is initiated through a change in the rate of change of dimension of the metal under treatment. Such change in the rate of change of dimension of the metal under treatment has been found to be much more satisfactory in determining the critical point of the metal than the change in temperature or in the rate of change of temperature of the metal under treatment or of a medium external to the metal under treatment. The object of the present invention is to provide a furnace in which the methods referred to can be practised advantageously and in which the heat treatment of metal can be carried on advantageously in other respects. In part the present invention relates to the construction of the furnace regardless of the control by the rate of change of dimension of the article under treatment, the furnace being well adapted for the heat treatment of metal under manual control, and in part to the means whereby the heat treatment is controlled through the change in dimension of the article under treatment. The invention will be more fully explained hereinafter with reference to the accompanying drawings in which it is illustrated and in which—

Figure 1 is a view partly in elevation and partly in vertical section of a furnace constructed in accordance with the invention.

Figure 2 is a top view of the same with some parts in horizontal section and some parts broken away.

Figure 3 is a detail view in horizontal section on the plane indicated by the broken line 3—3 of Figure 1 on a larger scale.

Figure 4 is a diagrammatic representation of the electrically operated controlling devices and their connections.

Figures 5 and 6 are detail views illustrating particularly a device for steadying an article the length of which is considerably greater than its diameter. Figure 6 being a view in section on the plane indicated by the broken line 6—6 of Figure 5 but on a larger scale.

The furnace comprises a charging station, a series of independent heating chambers, a quenching tank and a drawing chamber, a conveyor by which the articles to be heat-treated are transferred in succession into the heating chambers, the quenching tank and the drawing chamber, suitable supporting means, operating devices, and controlling devices, the operation of which, in the practise of the methods referred to, is initiated by a change in dimension of the article under treatment. In the embodiment of the invention shown, the heating chambers, the quenching tank and the drawing chamber, together with the charging station, are arranged in a circle and the conveyor moves about an axis concentric with such circle and has as well an up and down movement by which the article under treatment is introduced into each heating chamber and the drawing chamber from below and is plunged into the quenching tank from above.

The article represented in the drawings as undergoing treatment is shown as a shaft, having a length many times greater than its diameter, and the furnace is constructed with reference to the treatment of such articles, but it will be understood, especially as this description proceeds, that other articles can be treated in the same furnace or that the parts of the furnace can be modified in proportion and design to suit articles of other shapes.

The charging station, heating chambers and drawing chamber are supported by a suitable framework 2 carried by columns 4 extended upward from the foundation 3, such framework, in the embodiment shown, being hexagonal in character and providing for a charging station 5, three heating stations, 6, 7 and 8, of graduated temperatures, a drawing station 9 and an unloading station 10. The several heating chambers and the drawing chamber are identical in construction, except that the automatic controlling devices are incorporated with the heating station 8 only, and a description and detailed illustration of one will suffice for all.

Each furnace 11, suspended from the frame 2, comprises, in the construction shown, a cylindrical shell 12, closed at its top by a plate 13 which has at its center a relatively small hole 14, and at its bottom by a plate 15, which has at its center a relatively larger hole 16. Centrally disposed within the shell 12 is a preferably cylindrical, electrically resistant heating element 17, which has at its top a relatively small hole 18, in line with the hole 14 of the plate 13 and is open at its lower end. Conductors 19, form a transformer or other suitable source of current supply, are extended through insulating bushings 20 in the shell 12 and are connected to the heating element or resistor 17 near its upper and lower ends. The heating element rests at its open lower end upon a suitable heat resisting and electrically insulating floor 21 which rests upon the bottom plate 15 and has a central opening in registration with the opening 16 of the plate 15. The space 22 within the resistor constitutes the heating chamber, or the drawing chamber, as the case may be, and the space between the resistor 17 and shell 12 is filled with heat insulating material indicated at 23, such filling serving to retain the resistor in position without securing devices.

Below the hexagonal frame 2 and mounted for up and down movement as well as rotary movement is a six-armed spider or carrier or conveyor 24, the arms 25 being formed substantially as shown and secured at their upper ends to a hexagonal hub 26 which is carried by a vertical, preferably hollow, plunger rod 27. The latter is itself carried by a plunger 28, in a rotatable cylinder 29, to which and from which a liquid under pressure from any suitable source is admitted and permitted to escape for the purpose of raising and lowering the carrier or conveyor 24, which is preferably guided in its movements by a rod 30 which depends centrally from the frame 2 and enters the tubular plunger rod 27.

At the lower and outer end of each arm 25 is a table 31 which supports during heat treatment the shaft 1 or other article to be heat-treated, this table being preferably made of nickel-chrome alloy or other heat resisting material. The article to be treated may rest upon this table, or in the case of a long slender shaft, it may be attached to the table at its lower end as by a stud 32 which enters the table and the lower end of the shaft. If it be desired further to steady a long slender shaft, a block 87, as shown in Figures 5 and 6, made of nickel-chrome alloy or other suitable heat resisting material, and adapted to fit freely within the resistor 17, may be provided and so formed as to be engaged by the upper end of the shaft as the shaft is introduced into the heating chamber, and to be raised with the upper end of the shaft, steadying and centering the shaft in the heating chamber. It will be understood that in the operation of the furnace each article to be treated is presented by the carrier or conveyor below the lower end of the respective heating chamber or drawing chamber, as the case may be, in axial alignment therewith, and is then raised into the heating chamber or drawing chamber, is permitted to remain there during the required space of time, is then lowered out of the chamber and is then transferred to position below the next heating chamber, or into the quenching tank or to the discharging station, as the case may be.

To provide for the movement of the conveyor, in the construction shown, the cylinder 29 is mounted on a turntable 34 and supported from a suitable foundation 36 by a suitable ball thrust bearing 35. A pipe 37 is extended downward from the cylinder 29 through the bearing 35 and foundation 36 into a stuffing box 38, in which it is free to rotate. The lower member 39 of the stuffing box is connected by a pipe 40 and a three-way controlling valve 41 to the source of supply of the liquid under pressure and to the discharge, so that, when the valve is moved to admit water to the cylinder, the carrier or conveyor will be raised and when the liquid is permitted to escape from the cylinder the carrier or conveyor will be lowered. The plunger rod 27 is provided with a key 42 to enter a key way 43 formed in the cap of the cylinder 29, so that the carrier or conveyor is compelled to rotate with the turntable 34. The turntable is actuated through the oscillation of the quenching tank, as hereinafter described.

For the quenching of the article to be treated after it has attained its final temperature in the third heating station 8, an oil or water tank 44 is provided and is supported so as to oscillate about an axis of the furnace, moving in one direction with the carrier and the article which is then submerged in the tank, and being restored to its initial position after the article being heat treated has been raised out of the tank. The tank is carried by a table 45 which is oscillated about the common axis, being centered by rollers 46 and supported for free movement by suitable ball bearings 47. At the outer edge of the table 45 is secured a worm sector 48 engaged by a worm 49 driven by a suitable electric motor 50, the operation of which is controlled automatically as hereinafter described. The turntable 34 is provided with a ratchet wheel 51 which is engaged by a pawl 52 carried by the oscillating table 45, reverse movement of the turntable 34, during the return movement of the oscillating table 45, being prevented by a stop pawl 53 supported on the foundation 36. By suitable devices the motor 50 is reversed after each complete forward movement of the oscillating table 45, as hereinafter explained and by these means, therefore, the quenching tank is oscillated through sixty degrees and at each forward oscillation the carrier or conveyor is moved forward through sixty degrees and each article being heat treated is thereby advanced from one station to the next. It will be understood that the operation of the valve 41 is so timed that the carrier or conveyor is raised and lowered when it is at rest rotarily.

As stated previously the change in the rate of change of dimension of the article under treatment, as it passes through a critical point, is made to initiate a change in heat treatment, that is, in advance of the article under treatment from one station to another. In the furnace illustrated the article passes through such critical point in the third heating chamber 8 and the devices by which the change in the rate of change of dimension is made to initiate the change in heat treatment are located in connection with such third heating chamber. These devices will now be described.

On the upper end of the article undergoing heat treatment, while it is in the third heating chamber 22, rests a pin 54 which passes freely through an insulating bushing 55 located in the hole 14 of the plate 13 and the hole 18 of the upper end of the resistor 17. The pin is provided with a shoulder, as at 56, to prevent the pin from falling through the bushing when the article under treatment is removed from the heating chamber. Above the pin 54 and normally resting thereon is a tapered block 57 received between and supported by jaws 58, hinged at 59 and together forming the pole pieces of an electromagnet 60 which is supported on the plate 13. As the article under treatment elongates, it raises the pin 54 and the block 57 and the block is held, by the described means, in its elevated position, even when the article under treatment contracts slightly, as it may when it passes through the critical point, so that the pin, which is supported only by the article under treatment, falls away from the block 57 and thus breaks the controlling circuit as hereinafter explained. Referring now more particularly to Figure 4, in which the electrical devices and their connections are illustrated diagrammatically, and in which the main supply wires are indicated at 61 and 62, it will be seen that the winding of the electromagnet 60, which controls the clutch for the circuit breaking device already described, is indicated at 63, while the coil of a circuit closer 65 is indicated at 64, the same being connected into the main circuit through the pin 54 and the block 57 above described. So long as the pin and block are in contact, the circuit closer 65 (which may be of any usual or suitable construction) is held open, but when the initiating circuit is broken at 54, 57, then the circuit is closed through the circuit closer 65 through the windings of a control motor 66 which, through suitable gearing, drives a controller drum 67, the contacts of which are indicated diagrammatically and in development. Through terminal 68, in co-operation with the contact 68ᴬ of the controller drum, the circuit through the coils of the control motor 66 is maintained, after the control motor has once been started, through a complete rotation of the controller drum, regardless of other circuits, the advancement of the carrier or conveyor 24 through one step being accomplished during one complete rotation of the controller drum.

Through a terminal 69 and contact 68ᴬ the coil 63 of the electromagnet 60 is also maintained in circuit (until the notch 70 is reached) and the electro-magnet 60 is made to hold the block in position. When the notch 70 reaches the terminal 69 the circuit through coil 63 is broken momentarily and the block 57, is permitted to fall again upon pin 54 so as to complete the circuit to the coil 64 in readiness for the next cycle.

Through terminal 71 and contact 71ᴬ of the controller drum, circuit is completed through the coil 72 of the electromagnetic device which operates the valve 41 to permit the discharge of liquid from the cylinder 29, thereby permitting the carrier 24 to descend. On the other hand, through terminal 73 and contact 73ᴬ of the controller, circuit is closed at the proper time through the electromagnetic device 74 which operates the valve 41 to admit liquid under pressure to the cylinder 29 for the purpose of raising the carrier 74.

Through the terminals 77, 78, and 79, the contacts 77ᴬ, 78ᴬ, 79ᴬ, 77ᴮ and 79ᴮ, the circuits through the field windings 75 and the armature winding 76 of the motor 50 are controlled, in connection with the contact strip 80, carried by the table 45 and the terminals 81 and 82. Through these connections provision is made for forward rotation and reverse rotation of the motor 50, the breaking of the circuit and the stopping of the motor when the table 45 has reached the end of its proper travel in either direction, and the restarting of the motor after a reversal and stopping.

It will be understood, of course, that the operation of the furnace does not become automatic, but must be hand-operated, until the article under treatment reaches the last heating chamber. Thereafter the operation becomes entirely automatic, aside from the placing of each article to be treated on the carrier at the loading station 5 and the removal of each article from the carrier as it is presented at the unloading station 10. In such automatic operation the article which has been placed on the carrier at the loading station is first transferred, in the lowest position of the carrier, to position beneath the first heating chamber. The rotary movement of the carrier then ceases, the valve 41 is moved to admit liquid under pressure to the cylinder 29 and the carrier is then moved upward to introduce the article into the heating chamber, the valve 41 being left open or closed as may be desired. After the lapse of a suitable period of time, during which the article receives its first heating, the valve 41 is shifted to permit the liquid to escape from the cylinder 29. The carrier then descends and, when it has reached its lowest position, the rotary movement of the carrier is resumed and the article is carried onward to position below the next heating chamber. In like manner the article is raised into the second heating chamber, is permitted to remain there to receive its further heating, is lowered out of the heating chamber, is transferred to position below the third heating chamber and is raised into the same where it is permitted to remain until it passes through its critical point. At this moment the change in the rate of change of dimension of the article, which takes place as the article passes through its critical point, initiates the several movements of the several parts of the apparatus by the breaking of the contact between the pin 54 and the block 57, through the closing of the control motor circuit at the point 65. It will be noted that the change in the rate of change of dimension of the article under treatment is presumed to be, in the case under consideration, a change from a positive increase or expansion to a negative increase or contraction, the metal for which the automatic control here shown and described is specially devised undergoing an actual contraction as it passes through its critical point. In the case of another metal the expansion might continue as the metal passes through its critical point but at a slower rate or it might continue to expand but at a higher rate, or it might suffer neither expansion nor contraction and in every such case the contraction of the initiating devices would be varied to suit the conditions presented although the controlling devices might be arranged and operated as already described. Whatever may be the construction of the initiating devices, it will be understood that such devices bring about the rotary movement of the carrier through sixty degrees (in the construction shown) at each stage and the up or down movement at the beginning or end of each stage respectively. At the time when the article passes through its critical point in the final heating chamber, the quenching tank 44 is below the final heating chamber at the station 8 and as the article is lowered out of the heating chamber it is plunged into the quenching tank and then is transferred, during the next forward movement of the quenching tank and the table 45, to position below the drawing chamber and the station 9, into which it is then raised and permitted to remain during the determined period of time. At the end of such period it is lowered out of the drawing chamber and is transferred to the unloading station where it is removed from the carrier.

It will be understood that various changes in details of construction and arrangement will be made not only according to the nature of the metal under treatment with regard to its action as it passes through its critical point, but as to the shape and character of the article under treatment and the character of the heat treatment itself, and that the invention is not limited to the particular construction and arrangement of parts shown and described herein.

We claim as our invention:

1. In a furnace for the heat treatment of metal, the combination of means to effect a change in the heat treatment and devices subject to a change in the rate of change of dimension of the article under treatment whereby the actuation of said means is initiated.

2. In a furnace for the heat treatment of metal, the combination of means to effect a change in the heat treatment, controlling devices therefor and devices subject to a change in the rate of change of dimension of the article under treatment whereby the actuation of said controlling devices is initiated.

3. In a furnace for the heat treatment of metal, the combination of means to effect a change in the heat treatment, controlling devices therefor and electromagnetic devices to initiate the actuation of said controlling devices and including the circuit controlling devices subject to a change in the rate of change of dimension of the article under treatment.

4. In a furnace for the heat treatment of metal, the combination of a heating chamber, means to effect a change in relation of the article under treatment and the heating chamber, and devices subject to a change in the rate of change of dimension of the article under treatment whereby the actuation of said means is initiated.

5. In a furnace for the heat treatment of metal, the combination of a quenching tank, means to effect a change in relation of the article under treatment and the quenching tank and devices subject to a change in the rate of change of dimension of the article under treatment whereby the actuation of said means is initiated.

6. In a furnace for the heat treatment of metal, the combination of a heating chamber, means to effect a change in relation of the heating chamber and the article under treatment, and electromagnetic devices to initiate the actuation of said means and including circuit controlling devices subject to a change in the rate of change of dimension of the article under treatment.

7. In a furnace for the heat treatment of metal, the combination of a quenching tank, means to effect a change in relation of the quenching tank and the article under treatment, and electromagnetic devices to initiate the actuation of said means and including circuit controlling devices subject to a change in the rate of change of dimension of the article under treatment.

8. In a furnace for the heat treatment of metal, the combination of a heating chamber, a carrier for the article to be treated, means to operate the carrier to change the relation of the article with respect to the heating chamber and devices subject to a change in the rate of change of dimension of the article under treatment whereby the actuation of the operating means is initiated.

9. In a furnace for the heat treatment of metal, the combination of a quenching tank, a carrier for the article to be treated, means to operate the carrier to change the relation of the article with respect to the quenching tank and devices subject to a change in the rate of change of dimension of the article under treatment whereby the actuation of the operating means is initiated.

10. In a furnace for the heat treatment of metal, the combination of a plurality of chambers, means to transfer the article under treatment from one chamber to the other and devices subject to a change in the rate of change of dimension of the article under treatment whereby the actuation of the transferring means is initiated.

11. In a furnace for the heat treatment of metal, the combination of a heating chamber and quenching tank, means to transfer the article under treatment from the heating chamber to the quenching tank and devices subject to a change in the rate of change of dimension of the article under treatment whereby the actuation of the transferring means is initiated.

12. In a furnace for the heat treatment of metal, the combination of a heating chamber and a drawing chamber, means to transfer the article under treatment from the heating chamber to the drawing chamber, and devices subject to a change in the rate of change of dimesnion of the article under treatment whereby the actuation of the transferring means is initiated.

13. In a furnace for the heat treatment of metal, the combination of a plurality of chambers, a carrier movable progressively to place the article under treatment in position to be introduced into each chamber in succession and movable in another direction to introduce the article into each chamber in succession, means to impart to the carrier its progressive movement and means to impart to the carrier its movement in the other direction.

14. In a furnace for the heat treatment of metal, the combination of a series of chambers arranged about a common center, a carrier capable of rotation about the same center and movable in an axial direction to an operative relation with respect to each chamber in succession, means to impart movement of rotation to the carrier and means to impart movement to the carrier in an axial direction.

15. In a furnace for the heat treatment of metal, the combination of a series of chambers arranged about a common center and open at one end to receive the article under treatment, a carrier mounted to rotate about the same center and capable of movement in an axial direction, an oscillating member, and operative connections whereby the oscillating member is caused to impart an intermittent rotary movement to the carrier.

16. In a furnace for the heat tratment of metal, the combination of a series of chambers arranged about a common center and open at one end to receive the article under treatment, a carrier mounted to rotate progressively about the same center to place the article under treatment in position to be introduced into each chamber in succession and capable of movement in an axial direction, a cylinder and plunger to impart movement to the carrier in an axial direction and means to admit and to permit the escape of liquid to and from the cylinder.

17. In a furnace for the heat treatment of metals, the combination of a heating chamber, a quenching tank mounted on a lower plane than the heating chamber and means to move the quenching tank into position below the heating chamber to receive therefrom the article under treatment and then from position below the heating chamber.

18. In a furnace for the heat treatment of metal, the combination of a heating chamber, a drawing chamber, a quenching tank supported on a plane below that of the heating chamber and drawing chamber and means to move the quenching tank into position below the heating chamber to receive therefrom the article under treatment and then into position below the drawing chamber.

19. In a furnace for the heat treatment of metal, the combination of a heating chamber, a carrier having an intermittent rotary movement and capable of movement in an axial direction, a quenching tank having a movement of oscillation about the axis of the carrier, means to impart movement to the carrier in an axial direction, and means whereby the oscillating movement of the quenching tank in one direction effects corresponding forward movement of the carrier.

20. In a furnace for the heat treatment of metal, the combination of a heating chamber, a carrier capable of rotary movement and of movement in an axial direction, a quenching tank, an oscillating table on which the quenching tank is supported, mechanism including a ratchet wheel and pawl whereby rotary movement is imparted to the carrier and means to impart axial movement to the carrier.

21. In a furnace for the heat treatment of metal, the combination of a supporting frame, a series of chambers supported by said frame about a common center and open at the lower ends, a carrier mounted to rotate progressively about the same center and to have movement in a vertical axial direction to introduce an article to be heat treated into each chamber in succession, a cylinder mounted concentrically with the carrier, a plunger and plunger rod to support the carrier and means to admit liquid and to permit the escape thereof to and from the cylinder to raise and lower the carrier.

22. In a furnace for the heat treatment of metal, the combination of a supporting frame, a series of chambers supported by said frame about a common center and open at the lower ends, a carrier mounted to rotate progressively about the same center to a position beneath each chamber in succession and to have movement in a vertical axial direction to introduce an article to be heat treated into each chamber in succession, a cylinder mounted concentrically with the carrier, a plunger and plunger rod to support the carrier, means to admit liquid and to permit the escape thereof to and from the cylinder to raise and lower the carrier, and means to rotate the cylinder and the carrier together.

23. In a furnace for the heat treatment of metal, the combination of a heating chamber, means to support therein the article under treatment, a slidable pin adapted to bear against the article and to be moved thereby as it expands, a block movable by the pin in one direction, means to prevent movement of the block in the opposite direction, an electric circuit including said pin and block and an electromagnetic device and broken by the separation of the pin and block, and devices for effecting a change in the heat treatment, the operation of which is initiated by said electromagnetic device.

This specification signed this 3d day of Sept., A. D., 1920.

LYMAN C. JOSEPHS, Jr.
GOTTFRIED WIRRER.